United States Patent [19]
Diaz

[11] Patent Number: 5,162,132
[45] Date of Patent: Nov. 10, 1992

[54] COLLAPSIBLE, INTERCHANGEABLE SPRAY BOOTH APPARATUS AND METHOD

[75] Inventor: William Diaz, Chicago, Ill.

[73] Assignee: Reclaim, Elk Grove Village, Ill.

[21] Appl. No.: 595,465

[22] Filed: Oct. 10, 1990

[51] Int. Cl.[5] .......................... B05D 1/06; B05D 15/12
[52] U.S. Cl. ...................... 427/470; 427/478; 118/326; 118/634; 118/DIG. 7; 454/50; 454/53
[58] Field of Search ................ 118/DIG. 7, 326, 634, 118/309; 98/115.2; 55/DIG. 46; 427/27, 424, 33; 454/50, 53

[56] References Cited

U.S. PATENT DOCUMENTS

| | | | |
|---|---|---|---|
| 4,760,951 | 8/1988 | MacGregor | 118/326 X |
| 4,924,803 | 5/1990 | Celant | 118/326 X |
| 4,932,354 | 6/1990 | Kistner | 118/305 |
| 4,934,308 | 6/1990 | Boyce et al. | 118/326 |

Primary Examiner—Evan Lawrence
Attorney, Agent, or Firm—Fitch, Even, Tabin & Flannery

[57] ABSTRACT

A collapsible spray housing and method of using the housing in electrostatic powder spray operations. The housing is collapsible so that it can be folded and inserted into a conventional cartridge filter type powder recovery system. Separate collapsible housings may be maintained, each interconnected with a respective cartridge filter, dedicated to running one particular color therethrough. A skeletal frame may be employed upon which the various collapsible housings may be inserted and removed between successive runs different colors.

22 Claims, 7 Drawing Sheets

FIG.3

COLLAPSIBLE, INTERCHANGEABLE SPRAY BOOTH APPARATUS AND METHOD

FIELD OF THE INVENTION

This invention relates to paint spraying systems for painting articles and to the capture and recovery of sprayed powder entrained in air and, more particularly, to spray painting and to the capture and recovery of overspray paint powder from an electrostatic paint booth.

BACKGROUND OF THE INVENTION

An electrostatic paint system consists of a paint booth or enclosure in which a coating such as paint powder is applied to parts, usually a conveyor is supplied for carrying parts into and out of the booth, and an electrostatic paint applying system. The paint applying system includes a powder spraying device which imparts a velocity to the paint powder articles which directs them toward the device to be painted, places an electrical charge on the powder particles, creates and electrical field between the device being painted and ground, and meters the powder. Electrically charged powder particles are attracted to and have an affinity for the grounded object to be painted since the grounded object assumes a polarity opposite that on the powder or spraying device. The charged powder particles are deflected from their original trajectory in the direction of the grounded object. An electrostatic adhesion system greatly increases powder transfer efficiency from the gun to the surface to be coated as compared to a non-electrostatic device.

The paint powder that does not adhere to the part is generally referred to as overspray. Overspray consists of powder that misses the part, rebounds from the part surface, and powder electrostatically deflected to other grounded surfaces such as spray booth metal components and article conveyors. Most overspray is entrained in the spray booth exhaust air.

To prevent oversprayed powder from polluting the workplace, and to provide for efficient powder recovery, articles are sprayed with powder while passing within the spray booth or housing. To recover the oversprayed powder, a filter system is employed through which the particulate entrained air from the spray booth is drawn. The filter system separates the powder form the air and the separated powder is then returned to the spray guns for reuse.

A problem common to all powder recovery systems is that of intermixing of differently colored powders between successive runs. In order to minimize this, it is known in the art to employ dedicated filter systems, such as cartridge cabinets, for each color to be run wherein each separate filter system is dedicated to recovery of only one particular color. That is, it is very difficult and time consuming to completely clean filter systems such as cartridge cabinets. Thus, dedicated filter systems are interchanged wherein a filter system dedicated to a given color is installed at the spray housing outlet when running that color, and replaced with another cabinet dedicated to the particular color to be run next. A primary concern in changing between successive colors is the prevention of intermixing of colors between successive runs. Even a small quantity of one color contaminating a second, different color will result in an undesirable speckling effect to sprayed articles or to a new batch of the second color whereby this batch must be replaced and scrapped.

In addition to helping prevent color intermixing, utilization of independent filter systems for each separate color provides significant time savings due to the elimination of the requirement that the filter system be completely cleaned between successive runs. Despite the time saved by interchanging filter systems, rather than cleaning the filters completely between runs of differing colors, considerable time is still required in blowing out the excess powder remaining in the spray housing, thoroughly scrubbing down the spray housing interior to completely remove any remaining overspray powder therefrom, and cleaning the hoses which supply the spray guns prior to running a subsequent color. It is required that this cleaning be thorough so as to prevent any contamination due to residual powder remaining in the spray booth and hose intermixing with the subsequent color run therethrough. Current designs utilize stainless steel spray booths since this material lends itself well to the repeated scrubbings required.

It is desirable to provide a powder recovery spray booth apparatus wherein the laborious task of cleaning the spray housing is eliminated while also providing improved means for assuring nc intermixing of separately colored powders.

One current design employs a plurality of adjacent rolls of plastic sheet wherein the sheets run along the interior side walls of the spray housing. The plastic sheet is unrolled and extended to cover the side walls of the spray housing. After running a first color, the sheets are advanced so that the powder tarnished portion of the plastic is moved out of the spray housing and a clean, unused portion of the plastic roll is brought into the housing. The theory is that by providing a clean portion of plastic to line the spray housing interior for each successive cartridge cabinet utilized, the aforementioned problems associated with color contamination are eliminated.

In practice, however, this design has been found undesirable in several respects. Powder has been found to accumulate in the gaps between adjacent plastic sheets which results in powder from one run remaining in the spray booth interior and intermixing with the differently colored powder passing therethrough in a subsequent run. Also, the plastic sheets do not cover the ceiling of the spray housing and powder accumulates thereat resulting in contamination of powders subsequently run through the spray housing interior. Furthermore, some operators find it cost prohibitive to continually resupply fresh plastic sheet for each successive run of differing color, and they scrub and clean plastic sheets for use with the second color rather than scrap the previously used plastic sheets. Therefore, there is a need for a spray booth apparatus which allows for successive runs of differing colors without the requirement of cleaning the spray housing interior between successive runs.

SUMMARY OF THE INVENTION

In accordance with the present invention, there is provided a collapsible, plastic spray housing for use in electrostatic powder spray operations, which is in contrast to the conventional rigid stainless steel spray housings previously employed. Articles are sprayed with powder as they pass through the spray housing. The exhaust outlet of the collapsible spray housing is attached to a conventional cartridge cabinet or other filtering system which is usually dedicated to one particular color, as is common in the art. Upon completion of spraying articles with a given colored powder in the spray housing, the spray housing is collapsed and stowed, preferably being stowed into the filter system. The collapsible housing may be transported and stowed at any convenient place and is preferably held and covered in its collapsed small volume state by bagging or covering the same. When the collapsed housing is used with a dedicated filter system, the exhaust port from the spray housing remains attached to the filter system while the spray housing is collapsed and inserted into the filter system or compacted and secured at the inlet to the spray housing.

When using a dedicated collapsed housing and a dedicated filter system to spray workpieces with a first color, the dedicated suitable filter system having an associated collapsible housing collapsed and stored therein is brought into position and the collapsed housing is removed from the cabinet and expanded. During the spraying of workpieces, excess or oversprayed powder is drawn from the collapsible spray housing into the filter system attached thereto. Upon completion of spraying workpieces with the first color, the spray housing is again collapsed and inserted into the filter system attached thereto with the cabinet thereafter sealed, as described further, below. To spray workpieces with a second, different color, the first filter system with the spray housing collapsed therein, dedicated to the first color, is moved out of position and a second filter system with its associated spray housing collapsed therein, both dedicated to the second color, is moved into position. The second collapsed spray housing is then removed from the second filter system and expanded to accommodate the spraying of the second colored powder therein. Since separate spray housings attached to associated filter systems are employed for each individual color to be run, there is no potential for color intermixing. It is not necessary that the collapsed plastic housing have its own dedicated filter system. Instead, the filter system could be cleaned between successive colors being filtered or for very short, inexpensive runs, a scrap filter system could be attached to the expanded spray housing to collect overspray for scrap rather than for reuse.

By providing a plastic flexible spray housing, significant cost savings are realized over conventional stainless steel housings, thereby making it practical and economical to have a spray housing dedicated solely to runs of a particular color attached to an associated cartridge cabinet which is also dedicated to that particular color.

Prior spray housings required extensive time and manpower to completely remove any remaining powder from the spray housing interior prior to changing colors so as to prevent contamination of the differently colored powders with one another, which would otherwise result in speckling of the powders and thereby cause a speckling effect upon the article being sprayed or a loss of powders because of the speckling thereof. With employment of apparatus in accordance with the present invention, there is no need to scrub down the interior of the spray housing between color changes. Additionally, since only one color is run within each of the dedicated, collapsible housings, the aforementioned intermixing problems from paint of a second color coming from the housing is eliminated.

Further advantages will become apparent as the description proceeds and the features of novelty which characterize this invention will be pointed out with clarity.

BRIEF DESCRIPTION OF THE DRAWINGS

In the drawings, wherein like elements are referenced alike.

DETAILED DESCRIPTION OF THE PREFERRED EMBODIMENT

As shown in the drawings for purposes of illustration, the invention is embodied in an electrostatic, adhesion powder spray booth apparatus constructed in accordance with the present invention. With initial reference to FIG. 1, the spray booth apparatus indicated generally at 10 is illustrated to show one arrangement of apparatus for carrying out the present invention.

Figures 1, 2:
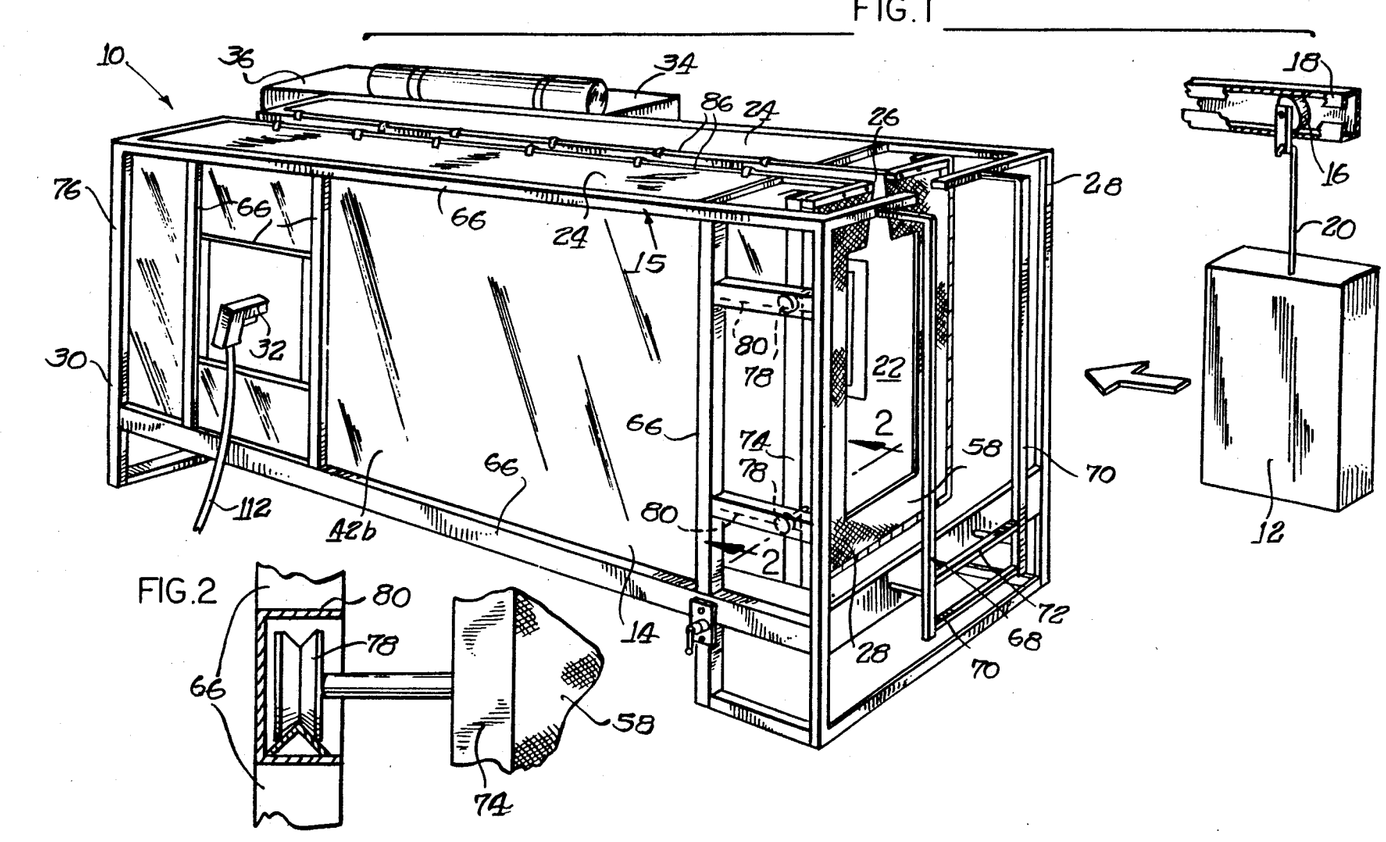
FIG. 1 is a perspective view of a spray booth apparatus embodying various features of the present invention, shown with a cartridge cabinet attached thereto and a collapsible housing expanded within the skeletal frame.
FIG. 2 is an enlarged, cross-sectional view of the roller portion of the embodiment of FIG. 1.

A workpiece 12 is transported into a spray housing 14, which may be supported by ar external skeletal frame 15, by a conventional conveyor having a carrier 16 and guide rail 18 assembly. The workpiece depends from the conveyor by one or more electrically conductive wires or hangers 20 so that the workpiece 12 is maintained at ground potential as it travels through the spray housing 14. The workpiece 12 enters the spray housing through a spray housing inlet 22 having a smaller cross-sectional area than the spray housing 14 so as to prevent migration of sprayed particulate therethrough. This reduced inlet 22, in combination with an inward airflow through the inlet 22, as discussed below, has been found to be sufficient to prevent escape of particulate through the spray housing inlet 22. A transporting slot 26 is provided in the roof 24 of the spray housing 14 and at the top of the spray housing inlet 22 which runs along the length of the spray housing 14 from the inlet end 28 to the outlet end 30 thereof to accommodate the depending hangers 20 which carry the workpiece 12 through the spray housing 14.

As the workpiece 12 passes through the spray housing 14, it is sprayed with the desired particulate. In one embodiment of the invention, the particulate is paint powder which is sprayed on the workpiece 12 by a spray gun 32 which is capable of providing a generally uniform particulate or powder spray comprising a plurality of paint powder particles. The spray gun 32 operates in a conventional manner, well known in the art, to electrostatically apply the powder to the workpiece. That is, the spray gun 32 is charged to a predetermined negative potential and imparts that negative potential to the particulate sprayed therefrom. The negatively-charged particulate or powder spray is then electrostatically attracted to the workpiece 12. Usually, this attraction is accomplished under the influence of the electrostatic field established by the polarity and potential difference between the electrostatic spray gun 32 and the workpiece 12. In other instances, a triboelectric paint sprayer charges the particles which are attracted to the grounded articles without the electrostatic field. A plurality of spray guns 32 may be employed which may be operated manually or automated, wherein the guns 32 are commonly situated on opposing sides of the workpiece 12 as it passes through the spray housing 14.

In operation, not all sprayed particulate adheres to the workpiece 12. Sprayed particulate which does not adhere to the part is referred to as "overspray." Overspray is comprised of particulate which misses the workpiece, particulate which rebounds from the workpiece surface, and particulate electrostatically deflected to other grounded surfaces. The majority of overspray powder is entrained in the spray housing exhaust air. Great savings are attainable by the ability to recover and reuse this entrained overspray particulate.

In order to recover at least a portion of the oversprayed powder, a conventional filter system such as a cartridge booth filter 34 is employed. While the invention is described with respect to employment of cartridge booth type filters, other filter systems are equally well suited for carrying out the present invention. A fan unit 36 draws the particulate entrained airflow from the spray housing 14 through the spray housing exhaust port 37 (see FIG. 5) and into the filter system 34. Therein, the powder particles are separated from the air and pumped back to the spray guns 32 for reuse. It is important in such particulate recovery apparatus, however, that particulate used and recovered in one run not be intermixed with any differing particulate run in a subsequent run. Even slight intermixing of colors results in an undesirable speckling effect when the captured overspray is reused. It is desirable to provide a powder recovery spray booth wherein color changes can be made rapidly while still maintaining separation of separately run colors. Apparatus constructed in accordance with the present invention provide significant improvements over prior designs in meeting these conflicting objectives.

Filter systems 34 require considerable time and manpower in order to be completely cleaned prior to a subsequent run as is required to prevent color intermixing. It is known in the art to utilize a plurality of separate, interchangeable filter systems 34 wherein each filter system is dedicated to one particular color. That is, after running a first color through a filter system 34 dedicated to runs of only that particular color, that filter system 34 is removed from the exhaust port 37 of the spray housing 14 and a separate filter system 34 dedicated to the color to be run next is inserted into the exhaust port 37 of the spray housing. This eliminates the considerable time otherwise required to clean the filter system 34 between successive runs of differing colors. However, considerable time is still required to clean the interior of the spray housing 14 between successive runs. Apparatus 10 constructed in accordance with the present invention eliminate the previously required need to clean the spray housing 14 between successive runs of differing colors, thereby providing for significant savings in time between changeovers and reduced waste associated with intermixing of differently colored powders.

Usually, the overspray is collected and reused. It is not uncommon that as much as 50% of the paint sprayed becomes overspray and almost all of the overspray is recaptured and reused. However, some people use a scrap collector or filter system 34 which collects overspray of various colors and they do not reuse this powder. Such scrap collectors are used with very short runs of articles. Of course, a collector 34 may be cleaned between colors and used with two different colors, each associated with a dedicated color, collapsible housing.

Figures 5, 6:
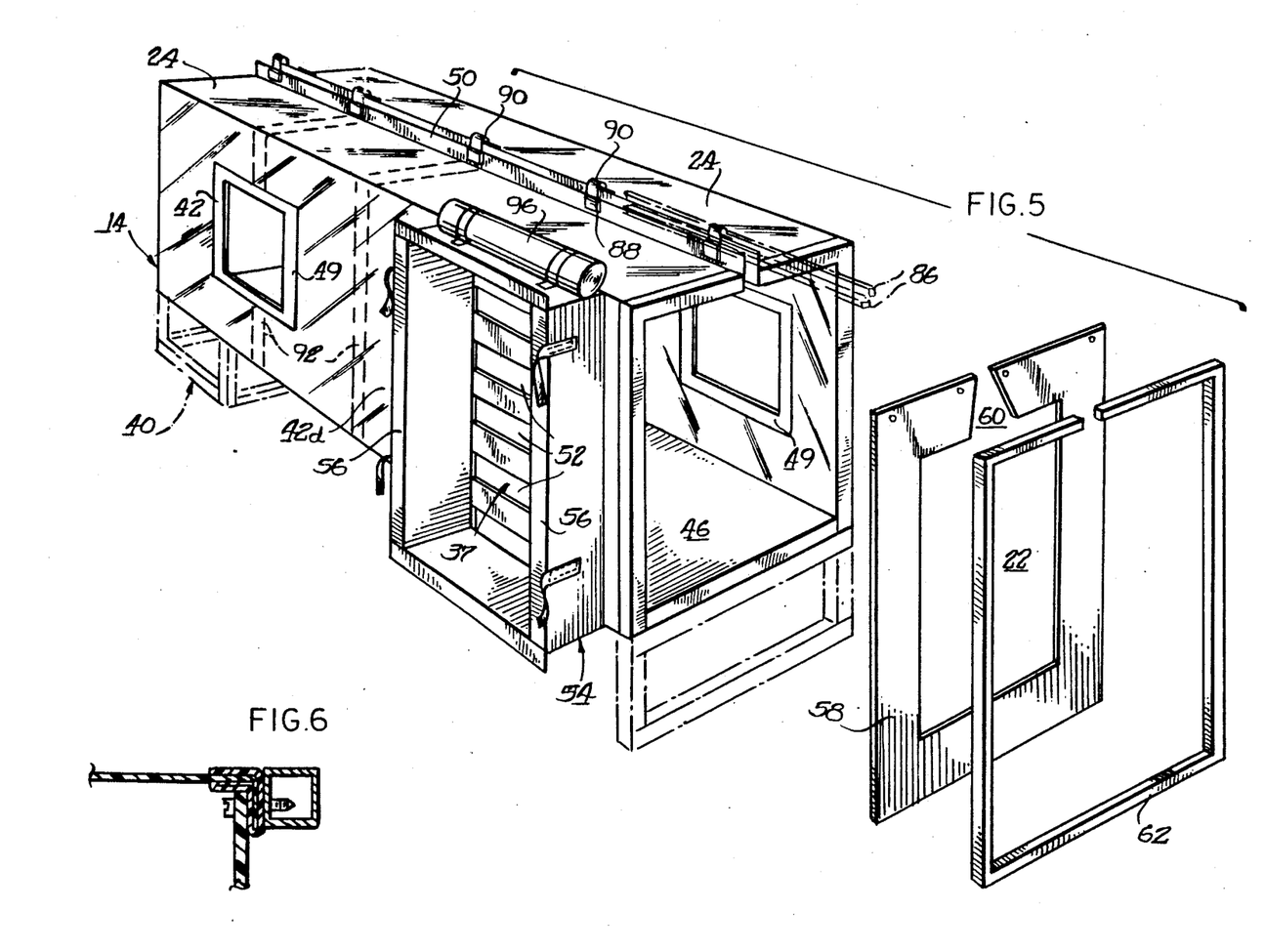
FIG. 5 is a perspective view of the embodiment of FIG. 1, illustrating the reverse side thereof.
FIG. 6 is an enlarged, cross-sectional view of one support member of the embodiment of FIG. 1, illustrating the attachment of the support member to the housing.
Figures 9, 9A, 10:
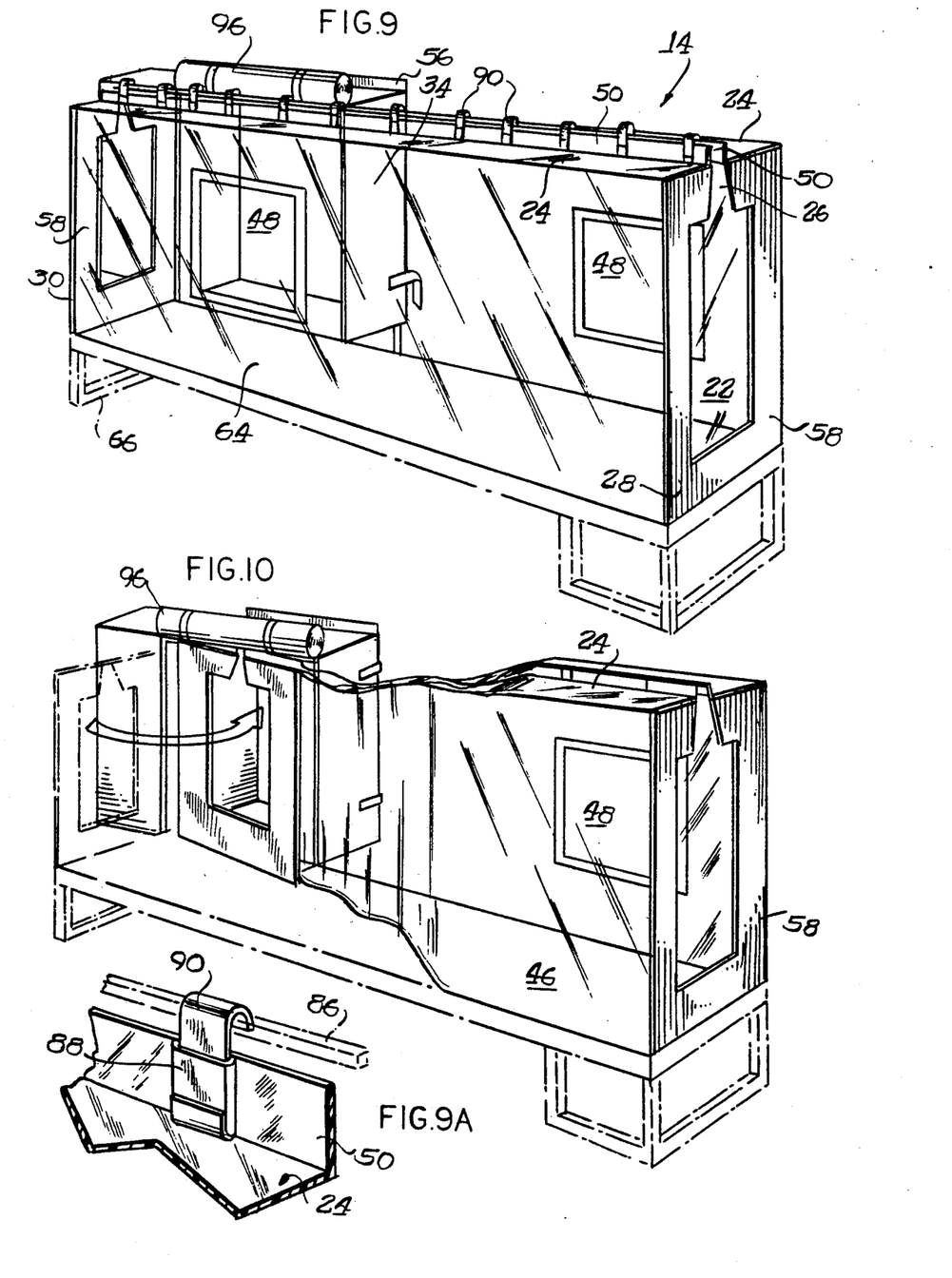
FIG. 9 is a perspective view of the embodiment of FIG. 1, showing the collapsible housing in its expanded position upon the skeletal frame.
FIG. 9A is an enlarged perspective view of the hook arrangement employed to support the top of the collapsible housing shown in the embodiment of FIG. 1.
FIG. 10 is a perspective view of the embodiment of FIG. 1, illustrating the collapsing of the housing and insertion of one end thereof into a cartridge cabinet filter system attached thereto.

With reference to FIGS. 5 and 10, the present invention provides a spray housing 14 which is collapsible, which is in contrast to current designs which employ a rigid spray housing usually constructed of stainless steel. The collapsible spray housing 14 is provided with an exhaust port 37 through which the particulate entrained airflow from the spray housing passes into the filter system 34. The collapsible spray housing 14 is affixed to the filter system 34 by any well known means so that the exhaust port 37 is maintained in communication with the filter system 34 with an airtight seal maintained therebetween. Preferably, the collapsible housing 14 is collapsible, and thereafter insertable, into an accommodating portion of the filter system 34. In accordance with the preferred embodiment of the present invention, separate collapsible spray housings 14 attached to respective filter systems 34 are employed.

Thus, briefly, to spray workpieces 12 with a first color, a suitable filter system 34 having an associated attached housing 14 collapsed and stored therein, dedicated to that first color, is brought into position and the collapsed housing 14 is removed from the cabinet and expanded. During the spraying of workpieces 12, excess or oversprayed powder is drawn from the collapsible spray housing 14 into the cartridge cabinet 34 attached thereto. Upon completion of spraying workpieces 12 with the first color, the spray housing 14 is again collapsed and inserted into the cartridge cabinet 34 attached thereto with the cabinet thereafter sealed, as described further, below. To spray workpieces 12 with a second, different color, the first cartridge cabinet 34 with the spray housing 14 collapsed therein, dedicated to the first color, is moved out of position and a second cartridge cabinet 34 with its associated spray housing 14 collapsed therein, both dedicated to the second color, is moved into position. The second collapsed spray housing 14 is then removed from the second cartridge cabinet 34 and expanded to accommodate the spraying of the second colored powder therein. Since separate spray housings 14 attached to associated cartridge cabinets 34 are employed for each individual color to be run, there is no potential for color intermixing.

Figures 11, 12, 13:
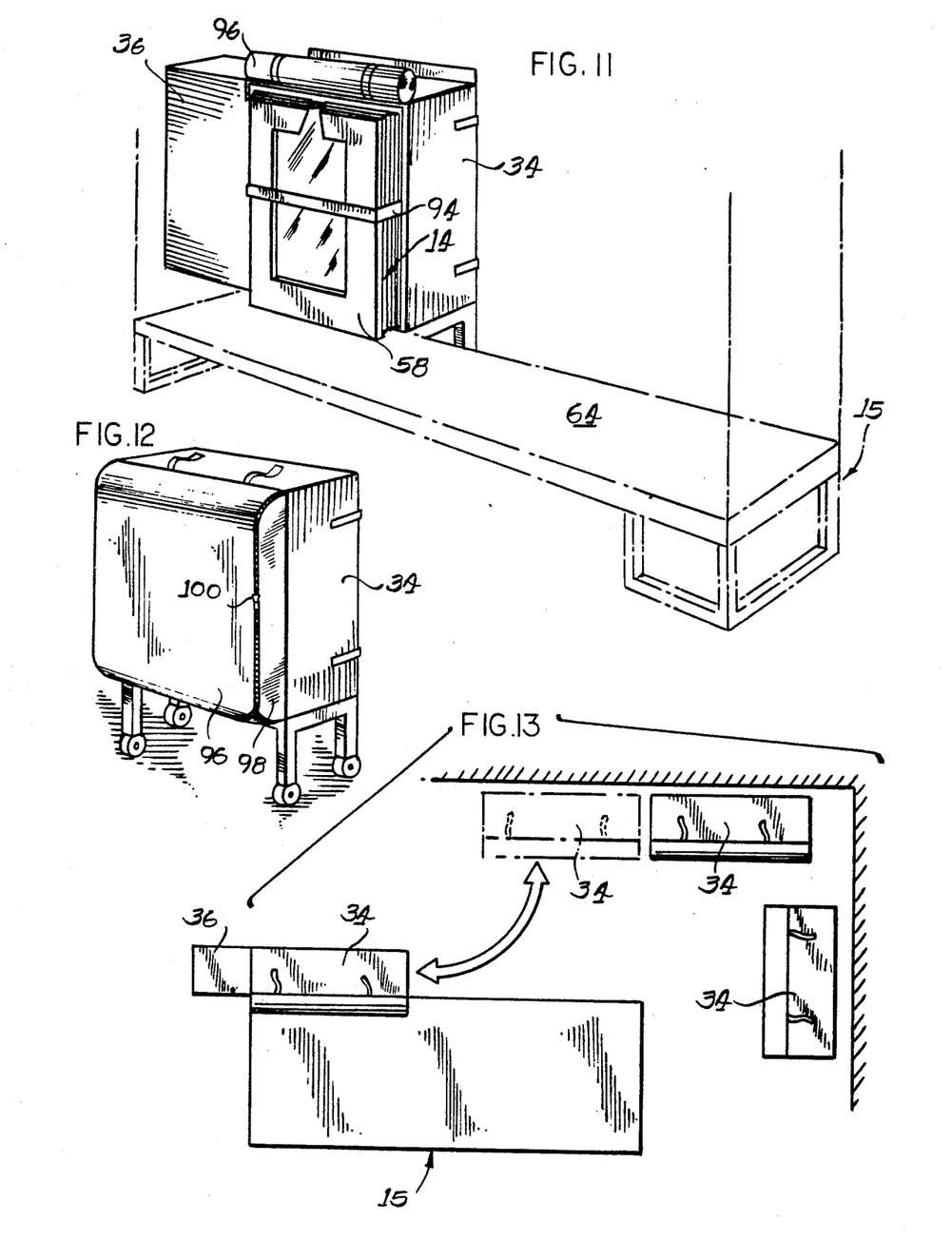
FIG. 11 is a perspective view of the embodiment of FIG. 1, illustrating the housing in its collapsed position and inserted into a cartridge cabinet filter system attached thereto.
FIG. 12 is a perspective view of the embodiment of FIG. 1, illustrating the zipper arrangement for storing cartridge cabinet filter system with the housing collapsed therein.
FIG. 13 is a top view of the embodiment of FIG. 1 illustrating the interchangeability of dedicated spray booths for use with a common skeletal frame.

In accordance with one embodiment of the present invention, a single superstructure or skeletal frame 15 is provided for supporting each of the separate collapsible housings 14 which are successively inserted and removed from the skeletal structure. The skeletal frame 15 is provided with means for supporting the collapsible side wall 42 and ceiling 24 portions of the spray housing 14 as well as means for expanding the spray housing 14 to its full length so as to remove any folds therefrom at which powder may otherwise accumulate. With the housing 14 fully expanded, workpieces can be passed therethrough and sprayed with powder therein. With the spray housing 14 collapsed, it can be folded and inserted into the filter system 34 as shown in FIG. 11.

The side walls 42, ceiling 24, and floor 46 portions of the collapsible spray housing 14 comprise a continuous sheet of flexible material, which may be comprised of a plurality of smaller sheets of flexible material interconnected. The flexible material is preferably a clear, flexible plastic sheet such as mylar of approximately 1 to 2 mils. thickness. This plastic sheet may be provided with reinforcing threads therein, such as nylon or the like, to help provide additional strength. Such materials have the desirable characteristics of transparency, flexibility, good strength and minimal stretching upon tensile loading. Other materials are equally well suited for carrying out the present invention, and it is readily appreciated that other materials may be substituted for those delineated herein without departing from the inventive concept.

Spray openings 48 are provided in the side walls 42 of the housing 14 through which powder is sprayed to coat workpieces 12 as they pass through the housing interior. Two generally square spray openings 48 located on opposing sides, 42a and 42b, of the spray housing 14 are shown in the drawings for purposes of illustration, however other shapes, locations, and greater or fewer openings may be provided as desired.

The ceiling 44 portion of the housing 14 is provided with a transporting slot 26 which runs along the length of the ceiling 44 from the inlet end 28 of the housing 14 to the outlet end 30. With brief reference to FIGS. 9 and 9A, opposing vertical lip portions 50 are provided in the ceiling 24 which define the transporting slot 26 therebetween.

As seen in FIG. 5, the rear side wall 42a portion of the housing 14 is provided with an exhaust port 37 which is connected to the inlet of the filter system 34 attached thereto, and through which the powder entrained air from the spray housing 14 interior passes. To provide a more uniform powder entrained airflow into the filter system 34, the exhaust port 37 may be comprised of a series of generally parallel narrow slatted openings 52 in the rear side wall. A connecting tunnel portion 54 of the spray housing 14 surrounds the exhaust port 37 extending generally perpendicular from the vertical rear housing wall 42a. The free end of the connecting tunnel 54 is flanged and is preferably reinforced with additional ply of sheet material to provide added rigidity and strength to the flanged portion 56. The flanged portion 56 is matable with a complementary flanged portion on the filter system inlet. The spray housing 14 and filter system 34 may be connected to one another by any well known means which will effect an airtight seal therebetween.

In further accordance with the preferred embodiment shown in the drawings, the opposing inlet end 28 and outlet end 30 of the spray housing 14 may include rigid members or end pieces 58. With continuing reference to FIG. 5, the inlet and outlet ends of the spray housing are comprised of a rectangular endpiece 58 which defines the inlet opening 22 therein and which has a tapered opening 60 in its upper end to align with the transport slot 26 for accommodation of hangers 20 therein. An outer frame 62, which is part of the skeletal frame 15, is provided with an opening in the upper end thereof and is used to provide reinforced securing of the rigid endpiece 58 to the remainder of the flexible spray housing 14. The opposing endpieces 58 at the housing inlet end 28 and outlet end 30 may be formed of any means suitable to define a framed inlet and outlet thereat, such as tubing accommodated in pockets sewn in the material or the like. Complex, collapsible inlet 28 and outlet 30 ends may be constructed, however as cost efficiencies are an important aspect of the present invention, such designs are not included in the preferred embodiment, but are well within the contemplated scope of this invention to those skilled in the art.

Thus, by pulling the opposing inlet end 28 and outlet end 30 of the spray housing 14 in opposing directions, away from one another, the spray housing is expanded to its operational position as shown in FIG. 1. The forces applied to the ends pulls the thin plastic sheets taut to make them substantially flat and planar.

Figure 3:
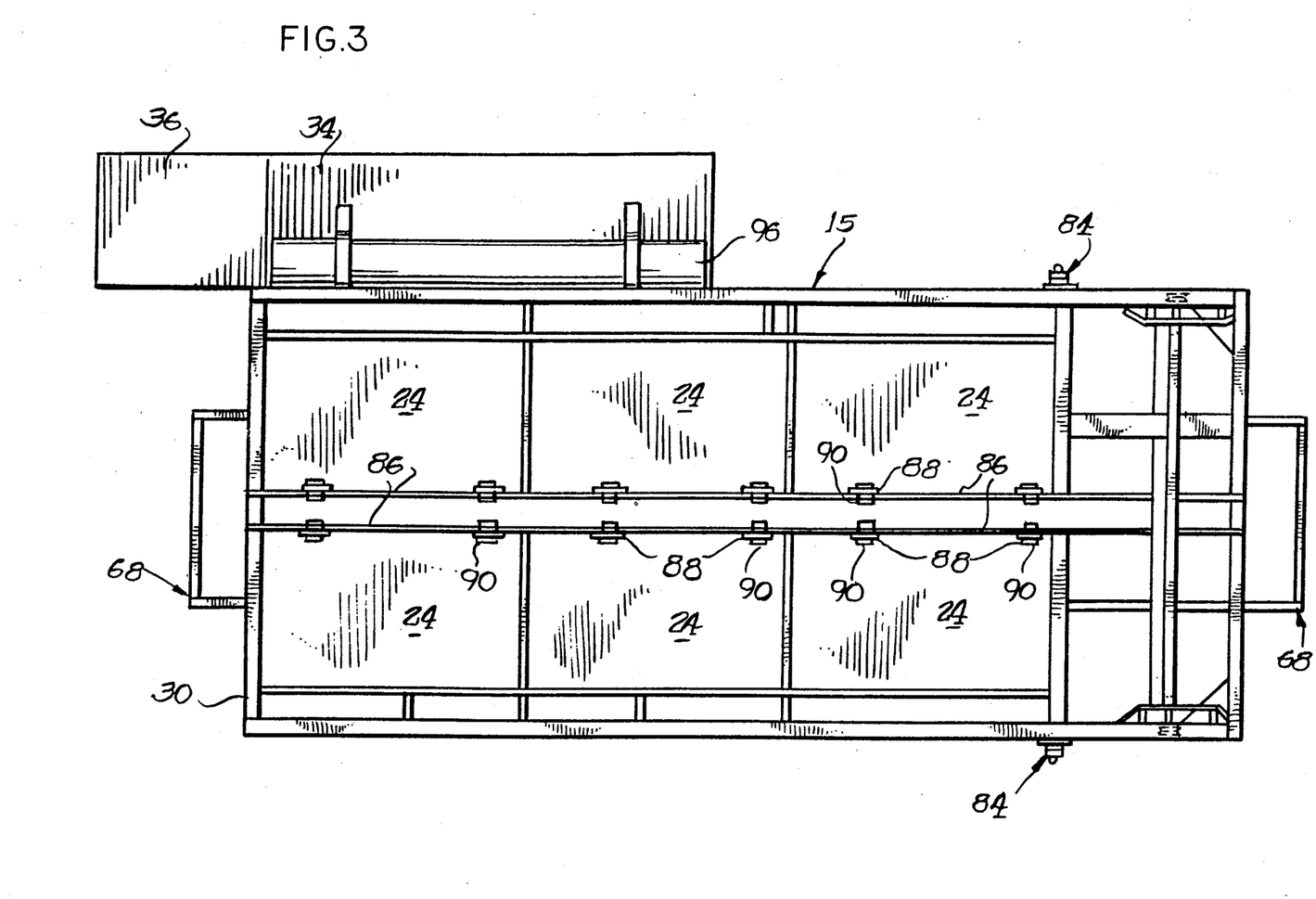
FIG. 3 is a top, elevational view of the embodiment of FIG. 1, particularly illustrating the skeletal frame.
Figure 4:
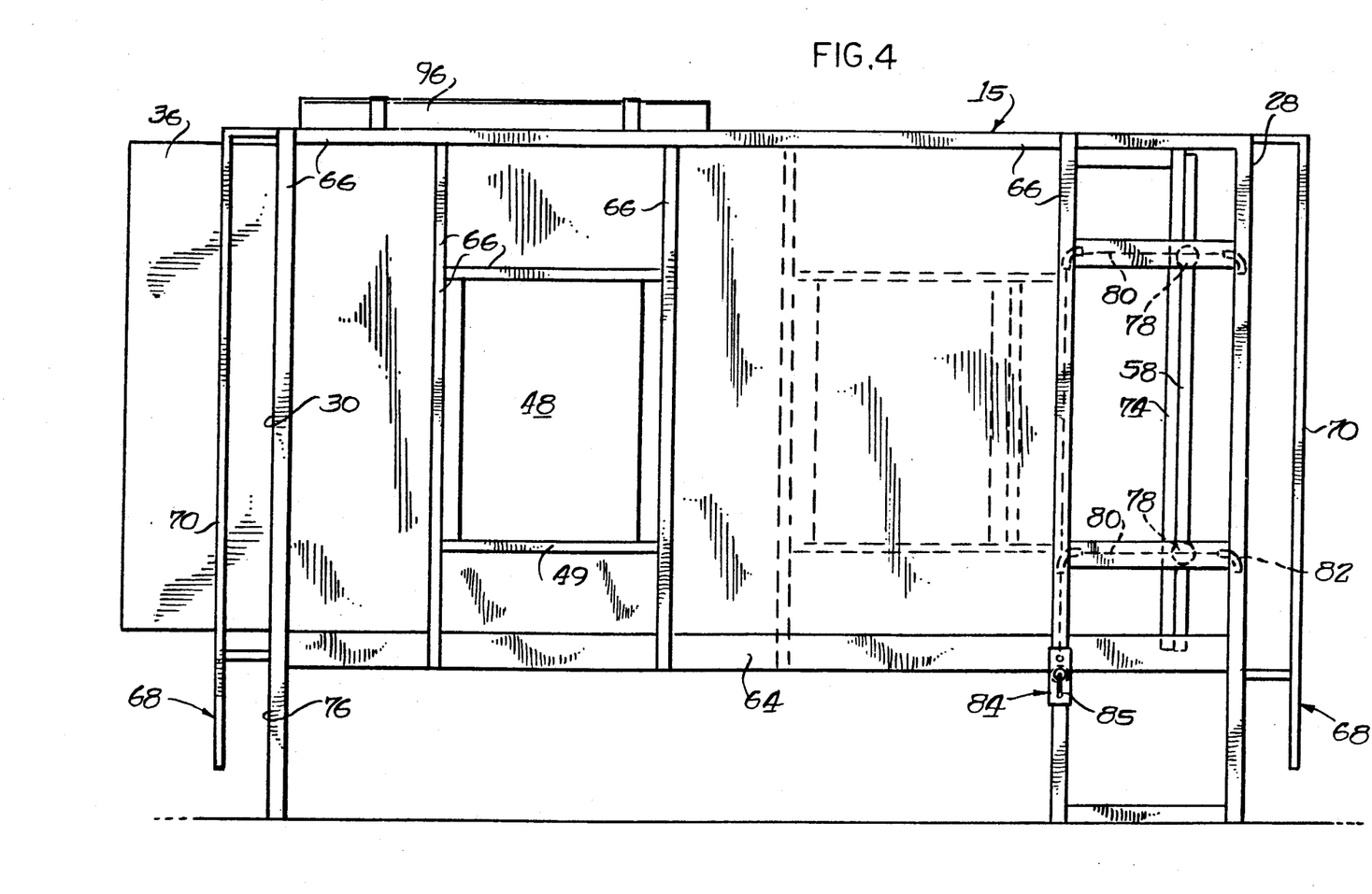
FIG. 4 is a side, elevational view of the embodiment of FIG. 1, particularly illustrating the skeletal frame.

To provide support to the flexible housing 14, an outer skeletal frame 15 is provided. A collapsed housing 14 is brought into the skeletal frame 15 and expanded therein, as described below. As best seen in FIGS. 1, 3 and 4, the skeletal frame 15 is generally comprised of a flat bed portion 64 and interconnected square tubular piping members 66 which form a rectangular framework proportioned to surround a spray housing 14 expanded therein.

In accordance with one embodiment of the skeletal frame 15, the flat bed 64 is supported in an elevated position to accommodate current conventional cartridge cabinet filter system designs. That is, the height of the flat bed 64 of the skeletal frame 15 determines the height of the exhaust port 37 of the housing 14 which is supported thereupon. It is desirable to provide a flat bed height, and exhaust port location, which will provide alignment of the exhaust port 37 with an already existing filter system inlet opening when the housing 14 is expanded and supported upon the frame 62. Square, tubular piping members 66 of the skeletal frame 15 support the flat bed 64 near its opposing ends.

At the opposing rear and front walls, 42a and 42b respectively, opposing outer rectangular frames are formed from square tubular piping members 66 of the skeletal frame 15. An inner latticework of square frame piping 66 is provided in the plane of the rectangular frames corresponding to the location of any spray openings 48 or the like to be employed. Extending horizontally from atop the opposing outer rectangular frames, and inward toward one another, square tubular piping members 66 define the top of the skeletal frame 15. The piping members 66 form two rectangular frames on the ceiling of the skeletal frame 15, separated by a gap therebetween to accommodate passage of a hanger 20 supporting a workpiece 12 therethrough. To provide additional support to the ceiling of the skeletal frame 15, and also to provide means for operators to step up upon the flat bed portion 64 to attach the flexible spray housing 14 to the skeletal frame 15, end support structures 68 are provided having two vertical square tubular piping members 70 positioned on opposing sides of the inlet and outlet openings which are connected at their upper ends to the outer rectangular frame of the horizontal ceiling member and connected at their lower ends to the flat bed 64. Horizontal stepping members 72 extend from one vertical end support 70 to the other, at a height below the flat bed 64, upon which operators can step to gain access to the spray housing 14 and its associated components. (see FIG. 1)

Thus, in operation a single skeletal frame 15 is provided which is used in common with each of a plurality of separate cartridge filters 34 having attached collapsible housings 14. Referring to FIG. 11, a filter 34, such as a cartridge filter as shown in the drawings, is brought into the proper position at the skeletal frame 15 with the fan unit 36 connected to the filter system 34 to draw air from the spray housing 14. The endpiece 58 at the inlet end 28 of the housing 14 is then attached to the traversing end frame 74, which will be discussed below. The endpiece 58 at the outlet end 30 of the housing 14 is then attached to the fixed outlet end 30 of the skeletal frame 15. The method of attachment of the end pieces 58 to the skeletal frame 15 may be any suitable attachment means known in the art which allow for simple, rapid insertion and removal of the endpieces 58, such as tongue in groove attachments. The illustrated end pieces 58 are sheets of semi-rigid or rigid plastic which are self-supporting and remain upright and are not foldable. The plastic end sheets are cut to have the top conveyor slot and the end opening through which the article travels. Folded, reinforced edges of the ceiling, floor, and rear side walks are attached by sewing or the like to the outer peripheral edges of these stiff plastic endwalls.

With the endpieces 58 of the collapsible housing 14 mounted, the housing 14 is partially expanded. The traversing frame 74, to which the inlet endpiece 58 is attached, is mounted upon rollers 78 supported by tracks 80 within which the rollers 78 traverse from one end of the tracks 80 to the other moving the traversing frame 74 therewith. (see FIGS. 1 and 4) Four rollers 78, two located on either side of the traversing frame 74, with four tracks 80 positioned horizontally at a height to accommodate the rollers 78, are provided to allow reciprocation of the traversing frame 74 over a length sufficient to stretch the side walls 42, ceiling 24 and floor 46 of the collapsible spray housing 14 to a generally straightened, fully expanded position. That is, by pulling the inlet endpiece 58 away from the fixed outlet endpiece 58, the collapsible housing 14 is pulled taut to straighten the flexible walls to take out folds and wrinkles in the sidewalls of the housing causing the upper slot to be straight and aligned with the path of the conveyor hook travel. Normally, the distance across which the traversing frame 74 traverses is one or two feet at most. The tensile force acting upon the traversing frame 74 may be provided by any of several well known means. In the preferred embodiment, a simple cable and winch system is used as this is an effective and simple means for attaining the desired tensile forces. Cable 82 extends from a winch 84 which is mounted to the skeletal frame 15 to the rollers 78 such that rotation of the winch handle 85 induces a tensile force in the cable 82 which, in turn, forces the traversing frame 74 away from the fixed outlet end 30 of the skeletal frame 15. The cable 82 pulls both the upper and lower portions, as well as on opposite sides of the traversing frame 74, so that traversing frame 74 does not tilt and bind in its travel. It is readily appreciated that automated means may be substituted for the manual spray housing 14 expanding and collapsing operations delineated herein, without departing from the invention; however, such automation adds significantly to the overall cost of such an apparatus and is therefore not included in the preferred embodiment.

The ceiling 24 of the spray housing 14 is supported from the two horizontal skeletal frame ceiling members 86 on opposing sides of the transporting slot 26. As seen in FIG. 9A, pockets 88 having reinforced plies, are sewn in the flanges 50 of the ceiling 24 to accommodate one end of S-shaped hooks 90, the other end of which are latched over the traversing slot, ceiling frame members 86 to support the ceiling 24. A plurality of hooks 90 spaced along the length of the spray housing ceiling 24 are employed, which allow for easy attachment and removal of the housing 14 to the skeletal frame 15.

Additional support to the collapsible housing 14 is provided by batens 92 secured by extra plies sewn into the spray housing 14 about its perimeter, as shown in the representative dashed lines in FIG. 5. The number and location of batens 92 will vary as required to suit the given operating conditions and materials employed in a given application. Batens 92 may also be provided around the spray openings 48 to provide the reinforced rims 49 on the openings.

With the spray housing 14 fully expanded and supported within the skeletal frame 15, as discussed above, workpieces 12 are passed through the interior of the spray housing 14 and coated with sprayed powder therein. The exhaust port 37 of the spray housing 14 is in communication with the cartridge cabinet filter 34 so that the particulate entrained airflow from the spray housing is drawn into the filter 34 under the inducement of the fan unit 36. After running all the workpieces 12 desired to be coated with a first particular color, the spray housing is collapsed. With the fan unit 36 still attached to the filter system 34 to draw particulate entrained air from the spray housing 14, the tension in the traversing frame 74 is released, allowing the housing 14 to slacken. The ceiling hooks 90 are then detached from the skeletal frame 15. Subsequently, the endpiece 58 secured to the fixed outlet end of the skeletal frame 15 is detached therefrom and placed into an accommodating portion of the filter cabinet 34, as shown in FIG. 10. Thereafter, the endpiece 58 attached to the traversing frame 74 is detached therefrom and placed adjacent the other endpiece 58 in the filter cabinet 34. The remainder of the collapsible housing 14 between the two endpieces 58 is folded up upon advancement of the traversing endpiece 58 toward the filter cabinet 34 and sandwiched between the endpieces 58 when they are placed in the filter housing 34, as shown in FIG. 11.

The fan unit 36 remains on during the housing collapsing to prevent migration of powder particles from the spray housing 14 through the spray openings 48, inlet and outlet openings, and transporting slot 26. Instead, powder particulate unsettled during the collapsing of the housing 14 is drawn into the filter 34.

With reference now to FIGS. 11-13, after the housing has been collapsed and inserted into the filter 34, one or more securing straps 94 are wrapped around the housing 14 to maintain it in position within the filter 34. Thereafter, a main cover panel 96 is unrolled from atop the filter 34, and placed over the housing 14. Two side cover panels 98 are pulled forward and a releasable fastener, such as a zipper 100 is advanced to join the main 96 and side 98 cover panels thereby sealing the spray housing 14 within the filter cabinet 34, as seen in FIG. 12. With the filter 34 sealed so that no powder will escape, the fan unit 36 is removed therefrom and the filter cabinet 34 with the spray housing 14 enclosed therein is wheeled away from the skeletal frame 15 to a storage area. A different filter cabinet 34 with a collapsible housing 14 stored therein, both dedicated to the particular color to be run next, is then wheeled into position as illustrated in FIG. 13. The cover panels are unzipped and retracted, the securing straps 94 undone, and the collapsible spray housing removed from the filter cabinet 34 and expanded, as described above, to accommodate the spraying of workpieces 12 with that particular color. Since the entire housing 14 and filter 34 are dedicated to runs of only that particular color, there is no risk of color intermixing between colors being run therein and colors run previously in a completely different housing and filter dedicated to a different color. Thus, dedicated filter systems 34 having attached, dedicated collapsible housings 14 attached thereto are interchangeable upon a common skeletal framework 15 as desired to accommodate successive runs of differing colors.

It is also readily appreciated that self supported housings 14 may be employed or other supporting means used to support the housing 14, without varying from the concept of providing a collapsible housing which is attached to a filter system 34 wherein both the housing 14 and filter 34 are dedicated to runs of only one color therethrough.

Figure 7:
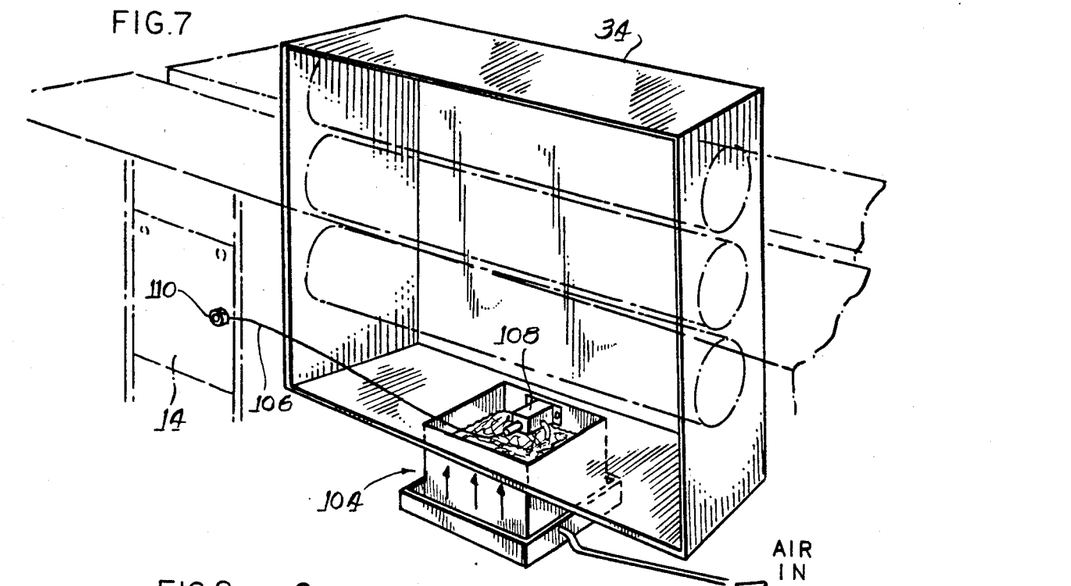
FIG. 7 is a perspective view of a cartridge cabinet filter system suitable for use with the present invention, and particularly illustrating the powder recirculation apparatus at the bottom thereof.
Figure 8:
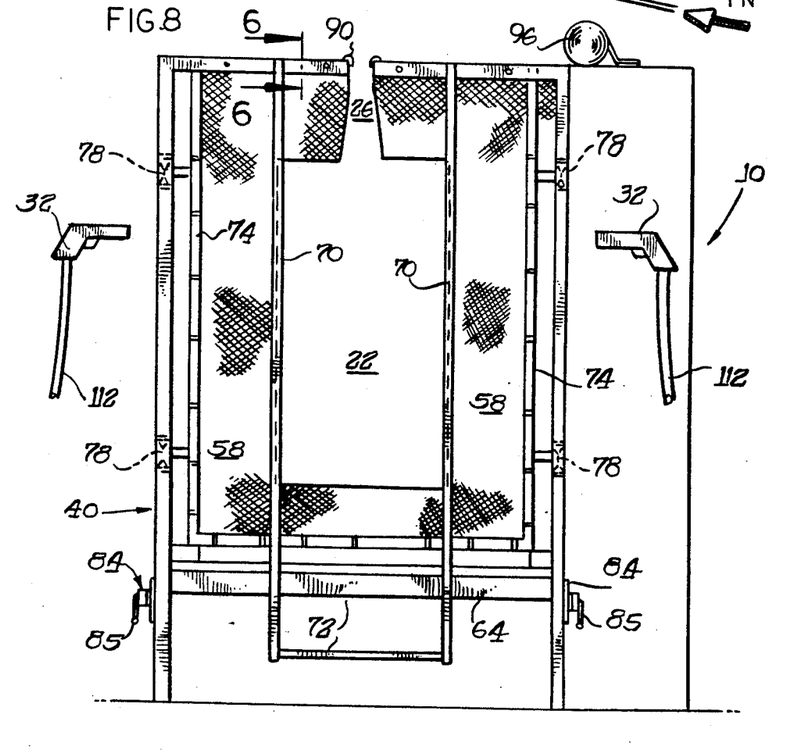
FIG. 8 is an end, elevational view of the embodiment of FIG. 1.

With reference to FIG. 7, to further minimize cleanup between successive runs of different colors, each filter system 34 may be provided with a powder recirculation apparatus 104 at the bottom thereof by which separated powder accumulates therein and is pumped back to the spray guns 32 for reuse. A length of conduit 106 extends from the pump 108 terminating at the grommet 110 provided in the housing 14. Providing each filter 34 with a conduit 106 and grommet 110 arrangement eliminates the need to clear that portion of the conduit 106 extending inward from the grommet 110. The hose 112 leading to the spray guns 32 can be connected to the conduit 106 at the grommet 110. Thus, only the spray guns 32 and that portion of the hose 112 between the spray guns 32 and grommet 110 require cleaning between successive runs of different colors. Accordingly, apparatus constructed in accordance with the present invention provide for rapid color changeovers without intermixing of the different colors run.

In some instances, the entire end wall may be made of thin, foldable sheet of plastic and a rigid tubular frame may be inserted into ends of the housing to support these thin, plastic sheets defining the end walls of the housing. The tubular frame may be attached to the winch tensioning device to pull the sidewalls taut. The tubular frame may be positioned into the collector or it may be removed from the housing and the housing may be folded into a package smaller in size than the tubular frame for storage at a place other than the collector.

While the invention has been described with reference to a preferred embodiment, it will be understood to those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of operating an electrostatic paint spraying system having an overspray collector and an electrostatic paint sprayer, said method comprising the steps of:

providing a collapsible and expandable housing movable to an expanded state in which the sprayer sprays paint of a first color on articles and in which paint overspray is contained within the housing and directed to the collector;

after spraying of the first color, collapsing the expanded housing to a smaller collapsed state with inward folding of the walls of the housing and removing the collapsed housing from an operative position on the frame with the paint of a first color on its interior walls for storage;

expanding a second collapsible housing from its collapsed state to its expanded state for painting a second color of paint and spray painting the second color in the second collapsible housing when in its expanded state;

collapsing the second housing to its collapsed state after painting the second color on articles and stowing the second collapsed housing;

re-expanding the first collapsed housing and using the re-expanded first housing when spraying the first color again; and re-expanding the second collapsed housing when spraying the second color again.

2. A method in accordance with claim 1 including the further steps of:

bagging the collapsed housing in its collapsed state to keep it in a small collapsed state and for ease of storing of the collapsed housing.

3. A method in accordance with claim 2 in which the bagging step includes the steps of folding the ends of the housing into the collector and folding the side walls of the housing into the collector and securing the collapsed housing with restraints against expansion while in the collector.

4. A method in accordance with claim 2 in which the bagging step includes the further steps of securing cover sections on the housing together to form an enclosing, exterior bag for interior collapsed walls of the housing to keep the housing in its collapsed state during storage and to aid in transporting the bagged housing to a remote storage location and for return for operative connection to the collector and paint sprayer.

5. A method in accordance with claim 1 in which an exterior frame means supports the expanded housing and has bag wall tensioning devices associated with the frame means, said method comprising the further steps of:

connecting walls of the housing to the tensioning means and exerting forces on these walls to pull taut the housing walls apart to straighten and flatten the housing walls.

6. In an electrostatic paint spray system using an electrostatic sprayer to paint articles being conveyed, said system comprising:

a collector for collecting overspray paint particles generated by the paint sprayer;

a frame means adjacent the collector; and a collapsible spray housing on the frame means for containing the paint spray generated by the paint sprayer and for delivering paint overspray to the collector;

said housing being formed of thin, flexible sheet material that is folded and collapsed inwardly after use into a smaller package into a storage condition, said collapsible housing being expandable and repositionable and expandable from its storage condition into an active paint spraying condition for reuse with the same color of paint, said housing having a bottom floor, a pair of upstanding end walls and a pair of upstanding sidewalls all joined together at abutting edges to eliminate gaps therebetween through which paint particles may flow and thereby retain powder therein when in use and when stored for re-use.

7. An electrostatic paint spray system in accordance with claim 6 wherein the flexible sheet material is a thin, plastic sheet having a thickness of 0.005 inch or less.

8. A spray paint system in accordance with claim 6 in which the collapsible housing includes a pair of upright, flanges spaced from each and defining a conveyor to travel slot for allowing a portion of a conveyor to travel through the slot for the length of the housing.

9. A collapsible spray booth tunnel formed of flexible material for spraying workpieces with particulate, comprising:

a bottom floor;

two depending sidewalls extending from opposing sides of said bottom floor;

two depending end walls provided with inlet and outlet openings through which workpieces enter and exit the spray booth tunnel; and a ceiling having a slot extending along the length thereof, from one end wall to the other to accommodate hanging workpieces therein as the workpieces traverse from the inlet opening to the outlet opening;

said bottom floor, said sidewalls, said end walls and said ceiling being joined together along abutting edges to eliminate gaps therebetween through which paint particles may flow and thereby retain paint powder therein when the booth tunnel is expanded and in use.

10. An apparatus in accordance with claim 9 wherein said end walls include a rigid material to resist folding thereof.

11. An apparatus in accordance with claim 9 in which said side walls are provided with spray apertures therein through which particulate is sprayed to coat workpieces inside said tunnel with particulate.

12. An apparatus in accordance with claim 11 in which one of said side walls is provided with an exhaust aperture therein through which particulate entrained airflow is drawn from the tunnel.

13. An apparatus in accordance with claim 11 in which said spray booth tunnel is collapsible for storing thereof.

14. An apparatus in accordance with claim 11 in which a plurality of separate tunnels, each dedicated to running of only one particular color therein, are maintained and wherein each of the plurality of tunnels are operable with a powder recovery means so that the tunnels may be selectably interchanged thereupon depending on the color desired to be run.

15. In an electrostatic paint spray system using an electrostatic sprayer to paint articles being conveyed, said system comprising:

a collector for collecting overspray paint particles generated by the paint sprayer;

a frame means adjacent the collector;

said frame means including a supporting, generally horizontal bed;

a collapsible spray housing on the frame means for containing the paint spray generated by the paint sprayer and for delivering paint overspray to the collector;

said housing being formed of thin, flexible sheet material that is folded and collapsed inwardly after use into a smaller package into a storage condition, said collapsible housing being expandable and repositionable and expandable from its storage condition into an active paint spraying condition for reuse with the same color of paint, and said collapsible housing having a floor for positioning on and covering the bed.

16. A spray paint system in accordance with claim 15 in which the frame means includes upright, exterior supports on the frame extending upwardly from the bed, and means attaching the collapsible housing to the upright exterior supports to hold the collapsible housing in its expanded condition.

17. In an electrostatic paint spray system using an electrostatic sprayer to paint articles being conveyed, said system comprising:

a collector for collecting overspray paint particles generated by the paint sprayer;

a frame means adjacent the collector; and a collapsible spray housing on the frame means for containing the paint spray generated by the paint sprayer and for delivering paint overspray to the collector;

said housing being formed of thin, flexible sheet material that is folded and collapsed inwardly after use into a smaller package into a storage condition, said collapsible housing being expandable and repositionable and expandable from its storage condition into an active paint spraying condition for reuse with the same color of paint, the collapsible housing including straps for securing the housing in its collapsed condition.

18. In an electrostatic paint spray system using an electrostatic sprayer to paint articles being conveyed, said system comprising:

a collector for collecting overspray paint particles generated by the paint sprayer;

a frame means adjacent the collector; and a collapsible spray housing on the frame means for containing the paint spray generated by the paint sprayer and for delivering paint overspray to the collector;

said housing being formed of thin, flexible sheet material that is folded and collapsed inwardly after use into a smaller package into a storage condition, said collapsible housing being expandable and repositionable and expandable from its storage condition into an active paint spraying condition for reuse with the same color of paint, cover sections being on the housing to form at least part of an exterior cover to bag the collapsed housing while being stored and transported.

19. A paint spray system in accordance with claim 18 in which the cover sections include an end flap for covering one end of the collapsed housing and in which releasable fasteners secure the end flap and other cover sections together when the housing is in its collapsed condition.

20. An electrostatic powder spray booth apparatus, comprising:

a stationary skeletal frame;

a filter system for separating oversprayed powder entrained in air and having a storage space therein;

a collapsible housing supportable upon said skeletal frame and connected to said filter system, said housing being insertable into said storage space in the filter system subsequent to collapsing of the collapsible housing, separate filter systems attached to respective collapsible housings being maintained, each dedicated to runs of a particular color and interchangeable between successive runs of differing colors.

21. An electrostatic powder spray booth apparatus in accordance with claim 20 wherein only a portion of the spray housing is inserted into said filter system subsequent to collapsing thereof.

22. In an electrostatic spray booth for coating articles with paint powder of the type having a powder recirculation system which includes a plurality of interchangeable filter systems, each dedicated to runs of a particular color, for separating air entrained overspray powder from a spray housing in which articles are sprayed, the improvement comprising:

a plurality of collapsible spary containment means, each connected in communication with one of said dedicated filter systems and collapsible therein so that separate dedicated filter systems having associated attached containment means may be employed for each color paint powder to be sprayed.

* * * * *